Patented Jan. 16, 1934

1,943,375

UNITED STATES PATENT OFFICE 1,943,375

PROCESS FOR THE MANUFACTURE OF ALKYL ETHERS OF HYDROXY ALIPHATIC ACIDS

Henry Dreyfus, London, England

No Drawing. Application March 8, 1929, Serial No. 345,442, and in Great Britain March 16, 1928

12 Claims. (Cl. 260—112)

This invention relates to the manufacture of alkyl ethers of hydroxy aliphatic acids, such for example as methoxy acetic acid and ethoxy propionic acid.

According to the invention I have found that alkyl ethers of hydroxy aliphatic acids may readily be prepared by reacting upon alkyl ethers (e. g. dimethyl ether or diethyl ether) with carbon dioxide in presence or absence of catalysts. Thus, for instance, methoxy acetic acid ($CH_3OCH_2COOH$) may readily be prepared by reacting upon dimethyl ether with carbon dioxide, and similarly, for example, ethoxy propionic acid may be prepared by reaction upon diethyl ether with carbon dioxide. The mechanism of the reaction is somewhat obscure but the process may conveniently be expressed by the following equations:—

$$CH_3OCH_3 + CO_2 \rightarrow CH_3OCH_2COOH$$
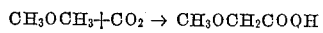
methoxy acetic acid $$C_2H_5OC_2H_5 + CO_2 \rightarrow C_2H_5O-CH_2CH_2COOH$$
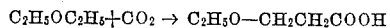
ethoxy propionic acid The process may be performed under atmospheric pressure but it proceeds more rapidly under elevated pressures. Pressures of upwards of 50 atmospheres may with advantage be employed, for instance, pressures of 100, 200 or 300 atmospheres or more. I usually perform the reaction at temperatures of from about 200° to 450° C. and preferably at temperatures of from about 300° to 400° C.

Any suitable catalysts may be employed for the reaction, for instance catalysts known to promote the synthesis of acetic acid from carbon monoxide and methyl alcohol. The following catalysts have been found particularly suitable:— inorganic acid catalysts, namely inorganic acids, or inorganic acids containing one or more organic groups—whether such acids are employed in the free state or in the form of an acid salt—e. g. boric, arsenic or phosphomolybdic acid; acids derived from oxides of phosphorus, e. g. ortho- meta- or pyro-phosphoric acids or mixtures of such phosphoric acids; aluminium phosphate $Al_2O_3, 12H_3PO_4$; acidic oxides such for example as oxides of aluminium, vanadium, titanium; alkali alcoholates e. g. sodium or potassium methylate or ethylate; alkali formates e. g. sodium formate.

Where it is desired to employ an inorganic acid as catalyst the same may be employed in the form of a volatile ester which is capable of decomposing under the conditions of reaction; thus for instance, phosphoric acid may usefully be employed for the reaction in the form of its methyl ester.

The catalysts, when employed, may be used in the liquid state, as in the case of phosphoric acid, or in the solid state, as in the case of alkali formates, alkali alcoholates, boric acid or acid aluminium phosphate, and they may be employed as such or may be distributed over or supported on a suitable carrier, such for example, as coke, graphite or the like. The catalysts may be charged into the reaction chamber before the beginning of the reaction, or may be added during the reaction, e. g. as a spray of a liquid catalyst, or in some cases in the form of a vapor of a volatile ester, e. g. a methyl ester, such as a methyl phosphate, which is decomposed under the conditions of the reaction to produce the catalyst, or they may be introduced into the reaction chamber in any other way.

In performing the invention I prefer to use excess of carbon dioxide, for instance, from about 1 to 3 molecules of $CO_2$ relatively to each molecule of alkyl ether, though it is of course understood that I do not limit myself to the employment of excess of carbon dioxide.

The invention may be performed in any suitable vessels or apparatus, for instance, vessels made of or lined with copper. The vessels or apparatus should of course be capable of resisting attack of the reaction gases and products of reaction and of the catalysts employed. Thus, for instance, where phosphoric acids are employed as catalysts, the vessels or apparatus thereof are preferably made of or lined with gold, graphite or the like. Metals, such as iron, which are liable to attack by the reaction products, should preferably be avoided. Copper is a highly useful substance for construction of the apparatus, but in cases where phosphoric acids are employed as catalysts, it is preferable to avoid the presence of air which appears to cause or accelerate the action of phosphoric acids on copper.

The alkyl ether and carbon dioxide may be subjected to the reaction in any suitable manner. Conveniently the process may be performed in a continuous manner by mixing the carbon dioxide and alkyl ether (e. g. dimethyl ether) in the desired proportions—e. g. 1 molecule of alkyl ether relatively to 1 to 3 molecules of carbon dioxide—and passing the mixture into a reaction chamber, preferably containing one or more phosphoric acids or other catalysts such as hereinbefore referred to, the reaction chamber being heated to a temperature of about 250° to 450° C. and preferably 300° to 400° C.

Or, for instance, the alkyl ether may be submitted to the reaction continuously with its production; thus, for instance, a mixture of methyl alcohol (or ethyl alcohol) and sulphuric acid may be heated in known manner to produce the alkyl ether and a regulated stream of carbon dioxide be run through the hot reaction mixture, whereby a mixture of alkyl ether and carbon dioxide may be obtained and subjected continuously to the reaction of the present invention. For instance a mixture of carbon dioxide and dimethyl ether (or diethyl ether) so produced may be caused to pass through compressors or the like in which it is raised to the desired pressure (e. g. 50–150 atmospheres or more) and from thence through a reaction vessel containing a phosphoric acid or other catalyst such as hereinbefore referred to heated to the desired temperature (e. g. 300° to 400° C.).

According to one convenient form of execution of the invention I may employ a closed train of apparatus comprising a gas circulating pump which drives or passes the mixture of alkyl ether and carbon dioxide (produced as above described or in any other suitable way) through a heat exchanger into the reaction chamber. The products issuing from the reaction chamber pass through the heat exchanger to a condenser provided with a receiver in which the uncondensable gases are separated from liquid products. The liquid products are withdrawn and the gases returned to the gas circulating pump. The circuit may be supplemented by pressure gauges, traps for acid, preheaters, flow meters, temperature controls and the like. The apparatus may of course comprise compressors or the like for raising the mixture to the desired pressure before the same is admitted to the reaction zone.

In such form of execution of the invention the reaction chamber may contain any device which will bring the gas well into contact with the catalyst, where such is employed. For instance in case of a liquid catalyst (e. g. a phosphoric acid) the mixture of $CO_2$ and alkyl ether may be bubbled through the liquid, or the reaction chamber may be arranged as a washing column or it may be rotary; further, if desired, a carrier material for the liquid catalyst may be provided. If a solid catalyst or a liquid catalyst spread upon a solid carrier is employed it is preferable to use the same in granular form.

The following example serves to illustrate a convenient form of execution of the invention, it being understood that this example is given solely by way of illustration and is in no way limitative.

*Example*

A mixture of dimethyl ether and carbon dioxide, containing about 2–3 molecules of $CO_2$ relatively to each molecule of dimethyl ether, is passed, under a pressure between 100 and 250 atmospheres through a reaction zone heated to a temperature between 300° and 400° C., the reaction zone being filled with pieces of graphite or coke soaked in phosphoric acid; the products of the reaction are condensed and the uncondensed gases returned for recirculation through the reaction zone. The condensed products are submitted to fractional condensation to recover the methoxy acetic acid in as pure a form as possible.

What I claim and desire to secure by Letters Patent is:—

1. Process for the manufactcure of alkyl ethers of omega hydroxy aliphatic acids which comprises reacting upon alkyl ethers with carbon dioxide at elevated temperatures.

2. Process according to claim 1 wherein the reaction is performed in presence of catalysts capable of promoting the synthesis of acetic acid from carbon monoxide and methyl alcohol.

3. Process according to claim 1 wherein the reaction is performed in the presence of an inorganic acid catalyst.

4. Process for the manufacture of an alkyl ether of an omega hydroxy aliphatic acid which comprises reacting upon an alkyl ether with carbon dioxide at temperatures between 200° and 450° C.

5. Process for the manufacture of an alkyl ether of an omega hydroxy aliphatic acid which comprises reacting upon an alkyl ether with carbon dioxide at a temperature between 200° and 450° C. under a pressure of between 50 and 300 atmospheres.

6. Process for the manufacture of methoxy acetic acid which comprises reacting upon dimethyl ether with carbon dioxide at elevated temperatures.

7. Process for the manufacture of methoxy acetic acid which comprises reacting upon dimethyl ether with carbon dioxide at elevated temperatures in presence of a catalyst capable of promoting the synthesis of acetic acid from carbon monoxide and methanol.

8. Process for the manufacture of methoxy acetic acid which comprises reacting upon dimethyl ether with carbon dioxide at elevated temperatures in presence of a phosphoric acid.

9. Process for the manufacture of methoxy acetic acid which comprises reacting upon dimethyl ether with carbon dioxide at a temperature between 200° and 450° C.

10. Process for the manufacture of methoxy acetic acid which comprises reacting upon dimethyl ether with carbon dioxide at a temperature between 200° and 450° C. under a pressure of between 50 and 300 atmospheres.

11. Process for the manufacture of methoxy acetic acid which comprises reacting upon dimethyl ether with carbon dioxide in presence of a phosphoric acid at a temperature between 200° and 450° C.

12. Process for the manufacture of methoxy acetic acid which comprises reacting upon dimethyl ether with carbon dioxide in presence of a phosphoric acid at a temperature between 200° and 450° C. under a pressure of between 50 and 300 atmospheres.

HENRY DREYFUS.